H. THOMASON.
Seed Planter.
No. 16,617.
Patented Feb. 10, 1857.
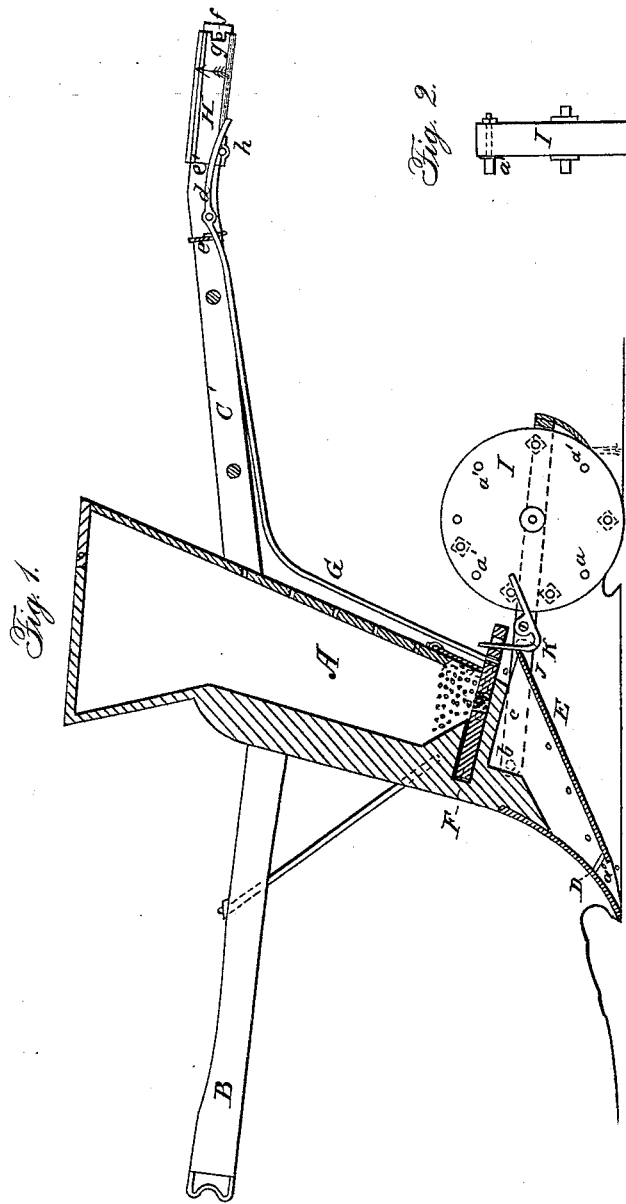
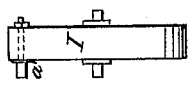
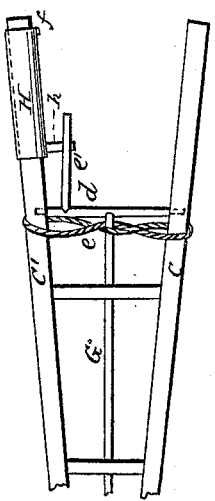

UNITED STATES PATENT OFFICE.

H. THOMASON, OF LAFAYETTE, INDIANA.

IMPROVEMENT IN SEED-PLANTERS.

Specification forming part of Letters Patent No. 16,617, dated February 10, 1857.

*To all whom it may concern:*

Be it known that I, H. THOMASON, of Lafayette, in the county of Tippecanoe and State of Indiana, have invented a new and useful Improvement in Seed-Planters; and I do hereby declare that the following is a full, clear, and exact description of the same, reference being had to the annexed drawings, making a part of this specification, in which—

Figure 1 is a vertical section of the feed box or hopper and distributing device, the other parts of the implement not being bisected. Fig. 2 is a detached edge view of the wheel provided with pins for operating the distributing device. Fig. 3 is an end view of the movable collar or tube by which the distributing device may be operated by hand. Fig. 4 is a detached plan view of the fulcrum-bar of the lever which actuates the slide F.

Similar letters of reference indicate corresponding parts in the several figures.

This invention relates to a certain improvement in seed-planters, whereby the seed may be sowed or planted in hills, the distributing device being actuated by the operator or attendant.

The invention consists in the employment or use of a movable collar or tube fitted on one of the handles of the implement, the collar or tube being provided with an arm which actuates a lever connected with the distributing device, the above parts being so arranged that the person having hold of the handles can operate the distributing device at will and without removing the hand from the handles.

To enable those skilled in the art to fully understand and construct my invention, I will proceed to describe it.

A represents a hopper or seed-box, having a beam, B, attached to its front side or end and two handles, C C', attached to its back side or end. The lower end of the hopper or seed-box has a share, D, attached to it, and an inclined plate, E, is attached to the lower end of the hopper or seed-box directly back of the share, a space, $a$, being allowed between the point of the share and the lower end of the inclined plate.

F represents a slide, which is fitted in the lower part of the hopper or seed-box, said slide resting upon the bottom $b$ of the hopper or seed-box. This slide has a hole or aperture, $c$, made through it, and the slide works through an aperture in the back end of the box or hopper, the seed, when the slide is drawn outward from the hopper or box, being discharged or passing from the hole or aperture $c$ into the space between the inclined plate E and the share D, the upper end of the plate E extending outward and beyond the back side of the seed box or hopper.

G represents a bent or curved rod, the lower end of which is fitted in the outer end of the slide F. The upper end of this rod G is attached to a cross-bar, $d$, the ends of which are fitted loosely in the inner sides of the handles, as shown clearly in Fig. 4. A spring, $e$, is connected with or attached to this cross-bar $d$, said spring having a tendency to keep the slide F within the seed box or hopper. The cross-bar $d$ has an arm, $e'$, attached to it, said arm projecting from the bar $d$ at right angles.

On the outer end of the handle C' a collar or tube, H, is fitted. This collar or tube is allowed to turn on the handle a certain distance, the distance of its movement being controlled by a pin, $f$, which fits in a notch or recess, $g$, in the outer end of the collar or tube, the pin $f$ being driven in the handle C. To the inner side of the collar or tube H an arm, $h$, is attached at right angles. The outer end of the arm $h$ extends underneath the arm $e'$ of the bar $d$.

From the above description of parts it will be seen that by turning the collar or tube H on the handle C' outward, as shown by the arrow, the arm $h$ will actuate the arm $e'$ on the bar $d$, and as the bar $d$ is the fulcrum of the rod G, which is simply a lever, the lower end of the rod or lever G will draw outward the slide F, and the seed will drop from the hole $c$ into the space between inclined plate E and share D, and when the collar or tube is released from the pressure of the hand the lower end of the rod or lever G will be thrown inward or toward the seed box or hopper A, and the slide F will consequently be moved inward, the hole $c$ passing within the seed box or hopper. Thus it will be seen that the person having hold of the handles can actuate the slide F at will by merely turning the collar or tube H on the handle C', and without removing the hand from said handles.

The implement, when the slide F is operated by hand, as described, is intended for planting seed in hills, and the person having hold of the handles can drop the seed at the desired points, the field or ground being previously furrowed in one direction, the seed being deposited in the ground at the points where the implement crosses the furrows. This moving or operating of the slide by the person at the handles insures the planting of the seed in the proper places.

A wheel, I, provided with pins $a'$, may be fitted in a frame, J, said frame being attached to the lower part of the seed box or hopper, and a bent lever, K, may be pivoted to the frame J, one end of said lever being fitted in the outer part of the slide F. The pins $a'$, as the wheel I rotates, act upon the opposite end of the lever and operate the slide F. This wheel I may be used when the seed is to be planted in drills.

I do not claim the slide F, nor the mode of operating the slide by the wheel I, with the pins $a'$ attached, and the bent lever K, for these parts are well known; neither do I claim operating the slide F by hand, irrespective of the means herein shown and described for effecting the purpose; but,

Having thus described my invention, what I claim as new, and desire to secure by Letters Patent, is—

Operating the distributing device or slide F by means of the lever or rod G, having the arm $e'$ attached to its fulcrum-bar $d$, which has a spring, $e$, connected with it, and the collar or tube H on the handle C' of the implement, the collar or tube H being provided with an arm, $h$, extending underneath the arm $e'$ of the fulcrum-bar $d$, the whole being arranged substantially as shown and described, for the purpose set forth.

H. THOMASON.

Witnesses:
PETER FAHNESTOCK,
JOHN THOMASON.